United States Patent [19]

Moore

[11] Patent Number: 5,316,386
[45] Date of Patent: May 31, 1994

[54] FLUID RECEPTACLE

[76] Inventor: Jae K. Moore, 24706 Mount Auburn, Katy, Tex. 77494

[21] Appl. No.: 24,434

[22] Filed: Mar. 1, 1993

[51] Int. Cl.⁵ .................... B65D 33/08; B65D 30/10
[52] U.S. Cl. ...................................... 383/10; 383/3;
383/63; 383/67; 383/36; 184/1.5; 184/106;
220/573
[58] Field of Search ............. 4/144.3, 315, 445, 455,
4/456, 479, 483, 484; 383/10, 3, 63, 41, 67, 65,
36, 906; 141/98; 184/1.5, 106; 220/573;
206/522

[56] References Cited

U.S. PATENT DOCUMENTS

| 435,058 | 8/1890 | Freund | 383/3 X |
|---|---|---|---|
| 2,066,400 | 1/1937 | Hale | 4/455 |
| 3,164,186 | 1/1965 | Weber et al. | 4/144.2 X |
| 3,381,315 | 5/1968 | Glassberg | 4/484 |
| 4,343,053 | 8/1982 | O'Connor | 4/484 X |
| 4,996,727 | 3/1991 | Wyatt | 4/484 |
| 5,121,776 | 6/1992 | Kovach | 383/41 X |

FOREIGN PATENT DOCUMENTS

| 0551216 | 6/1958 | Italy | 383/63 |
|---|---|---|---|
| 2255011 | 10/1992 | United Kingdom | 4/483 |

Primary Examiner—Allan N. Shoap
Assistant Examiner—Jes F. Pascua
Attorney, Agent, or Firm—Bill B. Berryhill

[57] ABSTRACT

A fluid receptacle formed of a bag having first and second sides, the bottom and lower outer edges of which are joined to provide a central pocket. The intermediate and upper outer edges of the first and second sides of the bag are provided with cooperating sealing elements by which the remaining outer edges of the bag may be sealed. The sealing elements are disengageable to permit the first and second sides of the bag to be laid open on opposite sides of the central pocket.

9 Claims, 3 Drawing Sheets

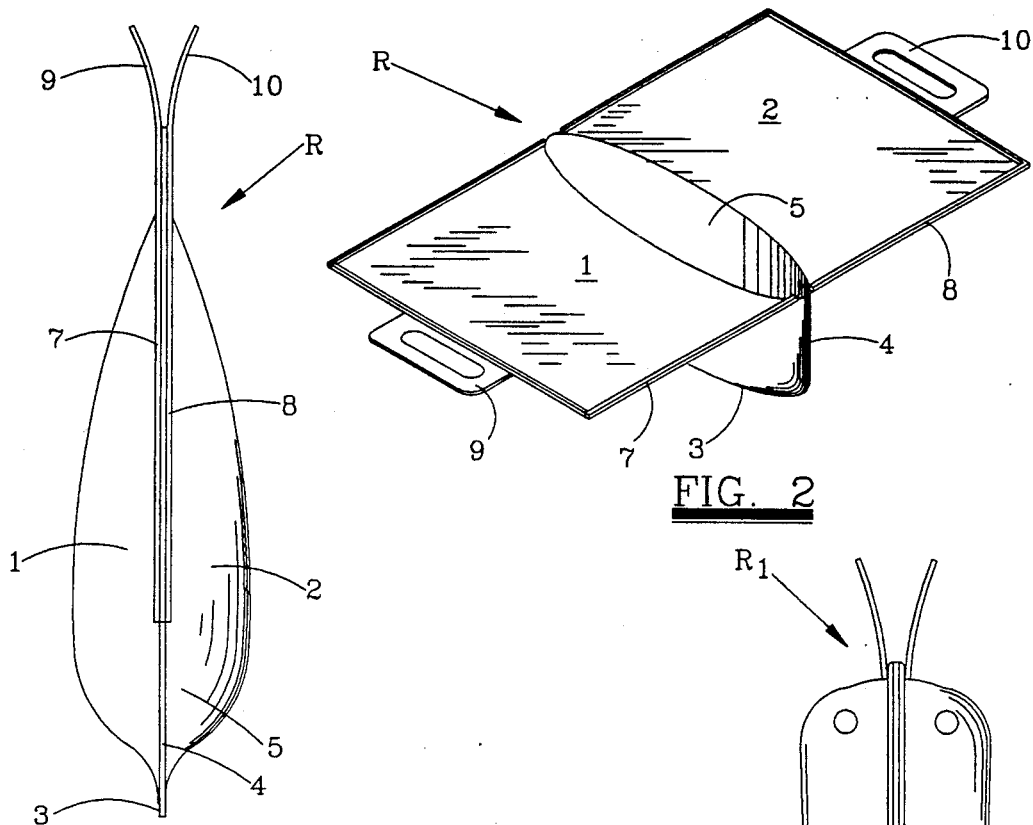
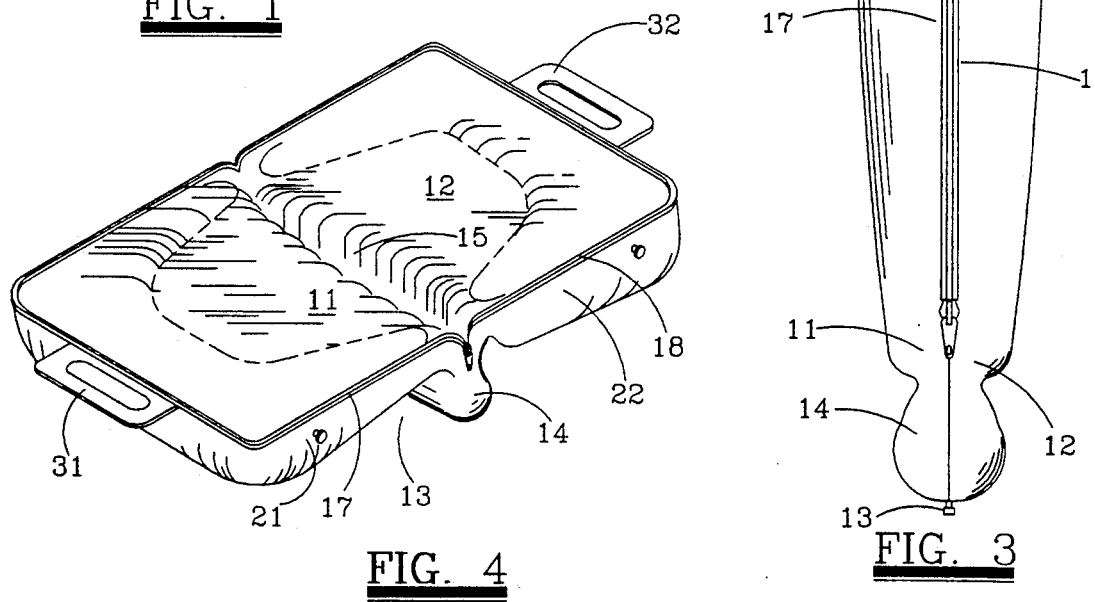

FLUID RECEPTACLE

BACKGROUND OF THE INVENTION

1. Field of the Invention

The present invention pertains to fluid receptacles. More specifically, the present invention pertains to fluid receptacles especially suitable for draining and collecting used oil from automotive vehicles.

2. Description of the Prior Art

When oil or other fluids are changed in a motor vehicle, it is of course first necessary to drain the fluid from the respective component of the vehicle. This is usually accomplished by removing a drain plug and allowing the fluid to drain therefrom. Typically, a pan or other receptacle is placed under the drain to receive the used fluid drained therefrom. In the past, the used fluid may have been carelessly handled and disposed of. In more recent years, the used fluids are collected and sometimes reconditioned. Due to increasing emphasis on environmental control and recycling of waste, such reconditioning and recycling of the fluids, particularly oil, will become even more prevalent.

Various types of receptacles have been especially designed in recent years to collect and dispose of fluids drained from vehicles. U.S. Pat. No. Re. 27,449 discloses a rigid type container which is provided with a funnel section for receiving liquids drained from an engine. A discharge spout closed by a removable cap is provided for emptying the container.

U.S. Pat. No. 4,296,838 discloses a system which provides two containers, one for drained oil and one for new oil. The two containers are shaped and fitted with means for holding them together as a composite package. In U.S. Pat. No. 4,640,431, a dual chambered container is disclosed, one chamber for receiving used engine oil as it is drained from the motor vehicle and another chamber for containing new oil. The chambers are somewhat nested or bonded together. In U.S. Pat. No. 4,856,652 a composite receptacle is described which includes a container to house and carry oil canisters and an oil filter. After the oil canisters and filters are removed, the container may he placed on its end to receive oil drained from a vehicle.

While recently developed fluid drain receptacles provide certain advantages over previous methods of draining used fluids,, most of them are relatively bulky and not easy to store. In addition, they have a tendency to be messy, unsightly and may easily contaminate other items with which they are stored. The fact that developments continue in this area indicates a need for more desirable designs.

SUMMARY OF THE PRESENT INVENTION

The present invention provides a fluid receptacle which is formed of a bag having first and second sides, the bottom and lower outer edges of which are joined to provide a central pocket. The intermediate and upper outer edges of the first and second sides of the bag are provided with cooperating sealing elements by which the remaining outer edges of the bag may be sealed to provide a receptacle for transporting fluid drained therein. However, the sealing elements are disengageable to permit the first and second sides of the bag to be laid open on opposite sides of the central pocket.

In a preferred embodiment of the invention, each of the first and second sides of the bag is provided with an inflatable and deflatable air pocket which, when inflated and when the first and second sides are laid open on a horizontal surface, elevate the top of the first and second sides so that any fluid draining onto the sides will gravitate toward the central pocket. The central pocket may be provided with a drain hole which is closed when receiving and transporting fluids therein but which may be open to allow draining of fluids from the central pocket.

When fluid is drained into the receptacle of the present invention from a vehicle, it is conveniently collected, sealed therein and easily transported to a collection point. The drain in the central pocket may be opened and the fluid drained therefrom. After fluids are drained from the receptacle of the present invention and when the air pockets, if any, are deflated, the receptacle may be sealed and stored flat or folded up in a very small space. Since it is sealed, no fluids will contaminate any items with which it is stored.

The fluid receptacle of the present invention is extremely light, economically manufactured, easy to use and store and especially environmentally compatible. Many other objects and advantages of the invention will be apparent from reading the description which follows in conjunction with the accompanying drawings.

BRIEF DESCRIPTION OF THE DRAWINGS

FIG. 1 is an edge view of a fluid receptacle, in a closed position, according to a preferred embodiment of the invention;

FIG. 2 is a pictorial view of the fluid receptacle of FIG. 1 shown in a laid open position, according to a preferred embodiment of the invention;

FIG. 3 is an edge view of a fluid receptacle, in the closed position, according to another preferred embodiment of the invention;

FIG. 4 is a pictorial illustration of the fluid receptacle of FIG. 3 shown in a laid open position, according to a preferred embodiment of the invention;

DESCRIPTION OF PREFERRED EMBODIMENTS

Figure 5:
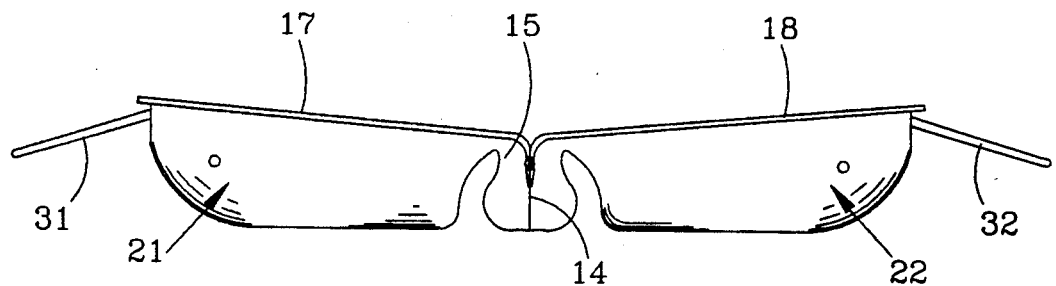
FIG. 5 is an edge view of the fluid receptacle of FIGS. 3 and 4 showing the fluid receptacle in the laid open position of FIG. 4.

Referring first to FIGS. 1 and 2, the fluid receptacle R of the present invention is formed of a bag having first and second sides 1 and 2, the bottom 3 and lower outer edges 4 of which are joined to provide a central pocket 5. The intermediate and upper outer edges of the first and second sides 1 and 2 are provided with cooperating sealing engagement means such as zipper elements 7 and 8 by which the remaining outer edges of the bag of receptacle R may be sealed to provide a receptacle for transporting fluid therein. In fact, the zipper elements 7 and 8 may also be provided across the tops of side 1 and 2 so that when engaged all edges of the receptacle R are sealed. The sealing engagement elements 7 and 8 are disengageable to permit the first and second sides of the bag R to be laid open on opposite sides of the central pocket 5 as shown in FIG. 2. The receptacle R may be laid open as in FIG. 2 and placed under the drain of a vehicle to collect oil draining therefrom. After collecting the drained oil, the receptacle R may be closed or sealed, as shown in FIG. 1, and the oil transported to a collection point or other point for disposal thereof. Handles 9 and 10 may be attached to the top of the first and second sides 1 and 2 for lifting and carrying the receptacle R and the contents thereof to various locations.

Referring now to FIGS. 3-7, another preferred embodiment of the invention is shown, which, like the previous embodiment, provides a bag like receptacle R1 having first and second sides 11 and 13, the bottom 13 and lower outer edges 14 of which are joined to provide a central pocket 15. Like in the previous embodiment, cooperating sealing engagement means, such as zipper elements 17 and 18, are provided so that the remaining outer edges of the bag (and the top edges if desired) may be sealed, as illustrated in FIG. 3, to provide a receptacle for transporting fluid therein. The sealing elements 17,18 are disengageable to permit the first and second sides 11 and 12 to be laid open on opposite sides of the central pocket 15 as illustrated in FIGS. 4, 5, 6, and 7.

In the embodiment of FIGS. 3-7, each of the first and second sides of the bag 11,12 are provided with inflatable and deflatable air pockets or chambers 21 and 22. These air pockets or chambers 21 and 22, preferably on the outside of the bag or receptacle R1, generally conform to the shape of an inverted U, the bases 23,24 of which lie near the top of its respective side 11 or 12 and corresponding legs 25,27 and 26,28 of which lie near the intermediate and upper outer edges of the respective sides 11 and 12. Each of the air pockets 21,22 are provided with an air valve 29,30 by which these pockets may be inflated or deflated. These valves 29 and 30 may be similar to the valves of a beach ball, allowing the pockets 21 and 22 to be inflated by the user blowing air through his mouth into the valves 29 and 30 into the corresponding air pockets 21,22.

Figure 6:
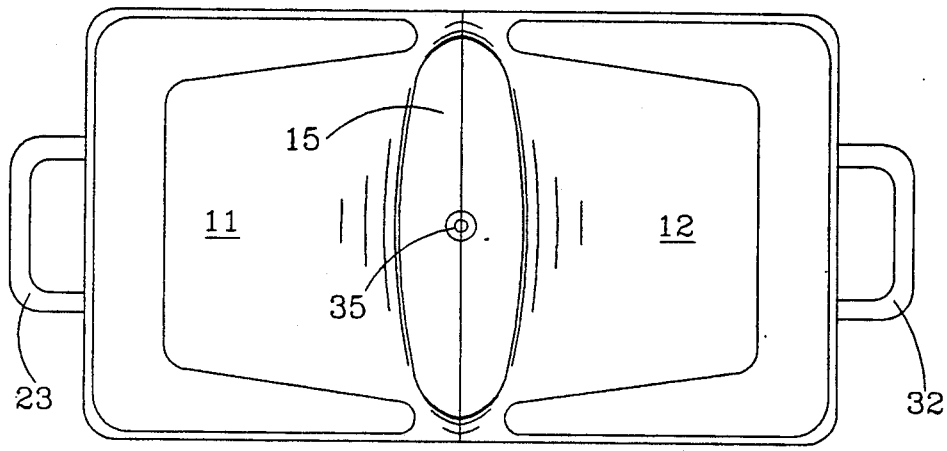
FIG. 6 is a laid open plan view of the fluid receptacle of FIGS. 3, 4 and 5 as viewed from above.
Figure 7:
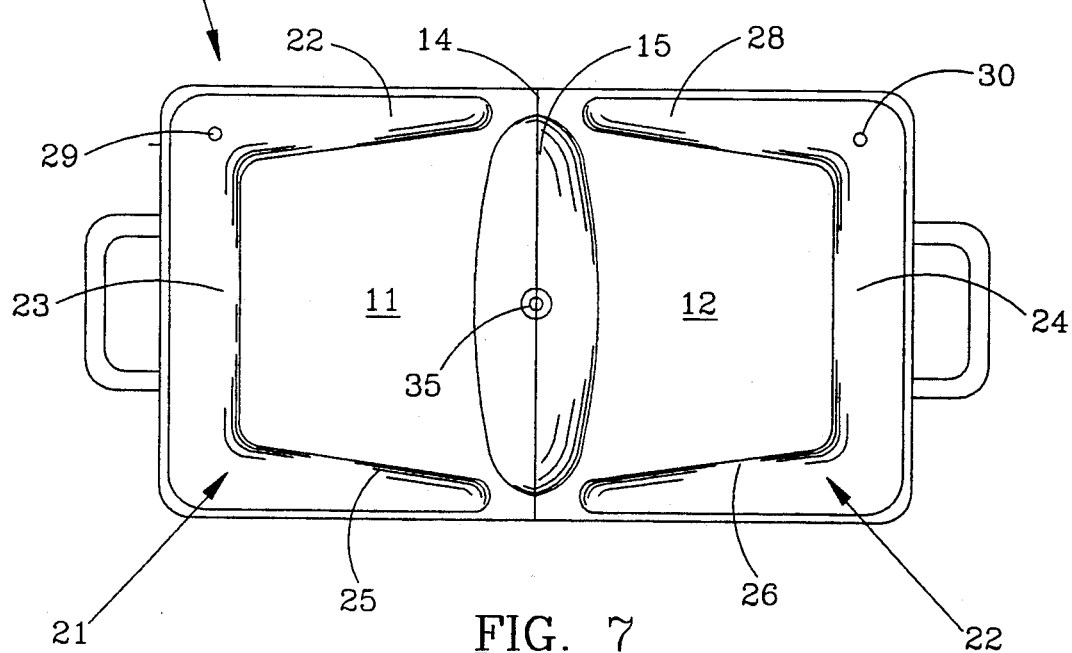
FIG. 7 is a plan view of the fluid receptacle of FIGS. 3, 4, 5 and 6 as viewed from below.

The cross-sectional areas of the base portion of the air pockets is relatively large. The cross-sectional areas of leg portions of the air pockets decrease from an area substantially the same as the base portions 23 and 24 toward the central pocket so that the surfaces of the first and second sides 11 and 12 when laid open on a horizontal surface, are inclined downwardly, as best seen in FIGS. 4 and 5, from the tops thereof toward the central pocket 14. Thus any fluids draining onto the sides 11 and 12 will gravitate toward the pocket 15. As best seen in FIGS. 6 and 7, the central pocket 15 may be provided with a drain hole 35 which is closed when receiving and transporting fluid therein but which may be opened to allow draining of fluids from the central pocket 15. As in the previous embodiment, handles 31 and 32 may be provided for transporting the receptacle R1 and any contents therein from place to place.

Figure 8:
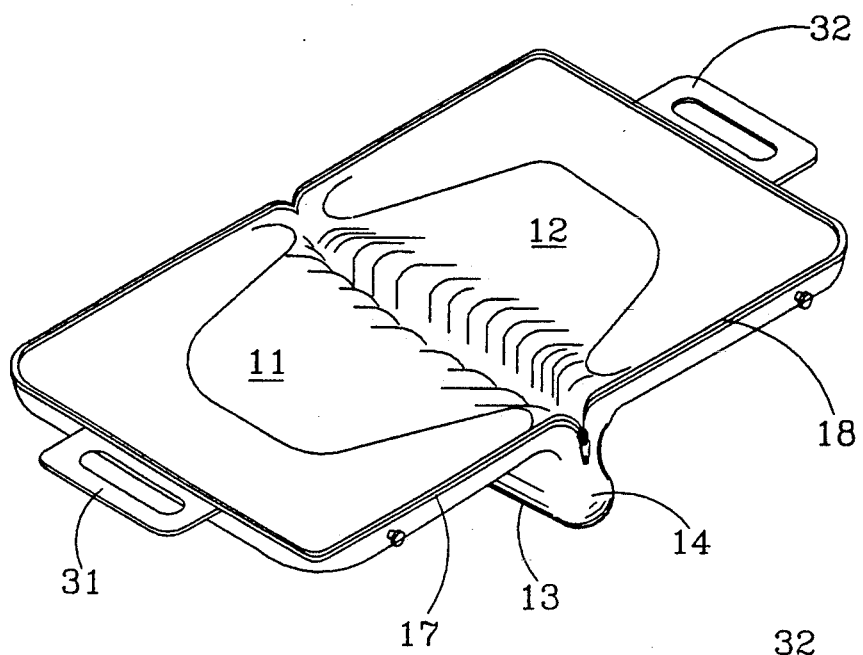
FIG. 8 is a pictorial illustration of the fluid receptacle of FIGS. 3–7, but in a deflated condition.
Figure 9:
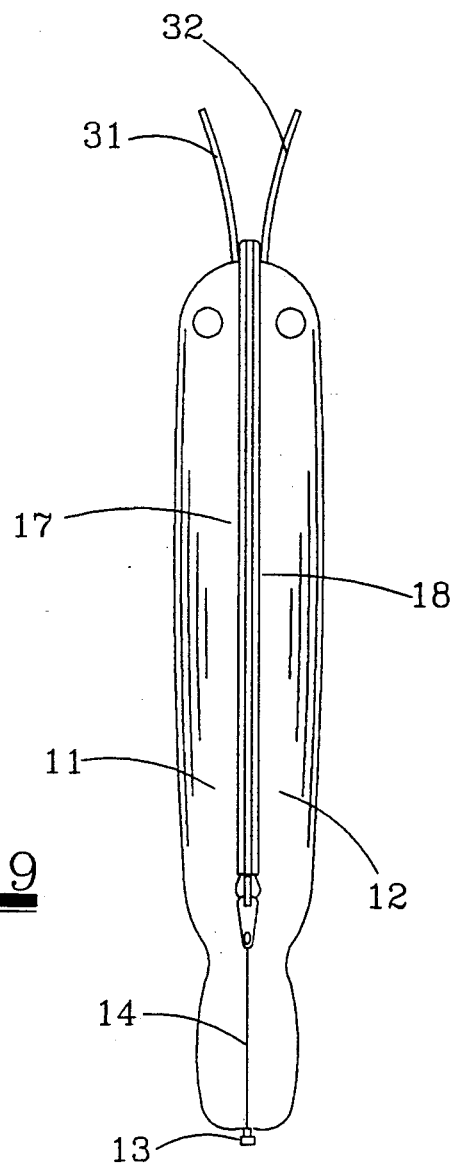
FIG. 9 is an edge view of the fluid receptacle of FIGS. 3–7 in a deflated condition.

Typically, the receptacle R1 would be stored in an empty flat condition. FIGS. 8 and 9 illustrate the receptacle R1 in an empty, deflated condition, FIG. 8 illustrating the receptacle R1 open, and FIG. 9 the receptacle R1 closed. Prior to use, the air pockets 21 and 22 would be inflated by introducing air through the air valves 29 and 30. The sealing elements 17 and 18 would be disengaged allowing the sides of the bag 11, 12 to be laid open as shown in FIGS. 4, 5, 6, and 7. The receptacle R1 would be placed under a vehicle with the central pocket 15 being substantially below the drain plug of the vehicle. The drain plug would be removed and fluids drained into the pocket 15. If any fluid drains onto the sides 11 and 12, it would gravitate along the inclined surfaces of the sides 11 and 12 toward the central pocket 15. After draining is completed, the receptacle R1 would be removed from under the vehicle, the receptacle would be sealingly closed by engagement of the sealing elements 17 and 18 and the receptacle R1 and its fluid contents would be carried by the handles 31 and 32 to a point of collection or other disposal. The drain hole 35 would be opened allowing fluids to drain therefrom. Then the drain hole would be closed and if desired, the air pockets 29 and 30 deflated. Any residual fluid would be sealed within the receptacle R1 for storage. The receptacle R1 would be stored in a flat position, such as FIG. 9, or folded as desired.

While the receptacle of the present invention is designed primarily to receive and transport oil or other fluids drained from a vehicle, it could have other uses. For example, a receptacle such as either the receptacle R of FIGS. 1 and 2 or the receptacle R1 of FIGS. 3-7 could be used for marinating meats or other foods. For example, a whole brisket could be placed in the receptacle R sealed therein and marinated. It could be turned occasionally so that all sides would be marinated. The receptacle could be used for transporting, storing or disposing of other foods. It could be used for disposing of trash or contaminated substances. It could be used to collect chemical spills, to transport contaminated items, to carry laboratory samples, etc. Of course, other uses could be found for the receptacles R and R1.

The receptacle of the present invention has many desirable characteristics. It is made in one piece so that parts of it are not lost or misplaced. Punctures can be easily repaired with a patch kit. The receptacle does not have to be cleaned prior to storage. Due to the low profile of the receptacle, a motor vehicle does not have to be elevated for a person to reach the drain plug.

Two embodiments of the invention have been described herein. However, many variations of the invention may be made without departing from the spirit of the invention. Accordingly, it is intended that the scope of the invention be limited only by the claims which follow.

I claim:

1. A fluid receptacle formed of a bag having first and second sides each with an inner surface and bottom, top and outer edges, said first and second sides being joined along said bottom edges and lower portions of said outer edges to provide a central pocket on opposite sides of which intermediate and upper edges of said first and second sides of said bag are unjoined, permitting portions of said first and second sides to be laid open, each of said first and second sides of said bag being provided near said top edge thereof with an inflatable and deflatable air pocket which, when inflated and when said first and second sides are laid open on a horizontal surface, elevate said top edges of said first and second sides above said central pocket so that any fluid draining onto said sides will gravitate toward said central pocket.

2. A fluid receptacle as set forth in claim 1 in which the air pockets provided with each of said first and second sides generally conforms to an inverted U, the base of which lies near the top edge of its respective side and corresponding legs of which lie near said intermediate and upper outer edges of its respective side.

3. A fluid receptacle as set forth in claim 2 in which the cross-sectional area of said legs of said air pockets decreases from said base toward said central pocket so that the inner surfaces of said first and second sides, when laid open on a horizontal surface, are inclined downwardly from said top edges thereof toward said central pocket.

4. A fluid receptacle formed of a bag having first and second sides each with an inner surface and bottom, top and outer edges, said first and second sides being joined along said bottom edges and lower portions of said outer edges to provide a central pocket, intermediate and upper portions of said outer edges being provided with cooperating sealing engagement means by which the intermediate and upper portions of said outer edges of said bag are sealable to provide a receptacle for transporting fluid therein, said sealing engagement means being disengageable to permit said first and second sides of said bag to be laid open on opposite sides of central pocket, each of said first and second sides of said bag being provided near said top edge thereof with an inflatable and deflatable air pocket which, when inflated and when said first and second sides are laid open on a horizontal surface, elevate said top edges of said first and second sides above said central pocket so that any fluid draining onto said sides will gravitate toward said central pocket.

5. A fluid receptacle as set forth in claim 4 including handle means attached to said top edges of said first and second sides and by which said receptacle and any contents thereof may be lifted.

6. A fluid receptacle as set forth in claim 4 in which said top edge of said first and second sides are also provided with cooperating sealing engagement means which in cooperation with said sealing engagement means of said intermediate and upper outer edges, when sealed, provide a totally and sealingly enclosed fluid receptacle.

7. A fluid receptacle as set forth in claim 4 in which said air pockets provided with each of said first and second sides generally conforms to an inverted U, the base of which lies near said top edge of its respective side and corresponding legs of which lie near said intermediate and upper outer edges of its respective side.

8. A fluid receptacle as set forth in claim 7 in which the cross-sectional area of said legs of said air pockets decreases from said base toward said central pocket so that the inner surfaces of said first and second sides, when laid open on a horizontal surface, are inclined downwardly from said top edges thereof toward said central pocket.

9. A fluid receptacle as set forth in claim 4 in which said central pocket is provided with a drain hole which may be closed when receiving and transporting fluids therein and which may be opened to allow draining of fluids from said central pocket.

* * * * *